United States Patent [19]

Bouette

[11] 4,272,558
[45] Jun. 9, 1981

[54] METHOD AND APPARATUS FOR PRODUCING A CELLULAR PRODUCT

[75] Inventor: David W. Bouette, Macclesfield, England

[73] Assignee: E. T. Oakes Limited, Macclesfield, England

[21] Appl. No.: 114,748

[22] Filed: Jan. 24, 1980

Related U.S. Application Data

[63] Continuation of Ser. No. 927,922, Jul. 25, 1978, abandoned.

[30] Foreign Application Priority Data

Jul. 27, 1978 [GB] United Kingdom ............... 31655/77

[51] Int. Cl.³ .............................................. A23G 3/00
[52] U.S. Cl. .................................... 426/660; 426/312; 426/317; 426/474; 426/631
[58] Field of Search ............... 426/312, 317, 374, 631, 426/660

[56] References Cited

U.S. PATENT DOCUMENTS

| | | | |
|---|---|---|---|
| 2,082,313 | 6/1937 | Todd | 426/474 X |
| 2,784,096 | 3/1957 | Ciccone | 426/474 |
| 3,168,217 | 2/1965 | Nilsen et al. | 426/477 X |
| 3,637,402 | 1/1972 | Reid et al. | 426/474 X |

FOREIGN PATENT DOCUMENTS

| | | |
|---|---|---|
| 712957 | 7/1965 | Canada . |
| 519511 | 3/1940 | United Kingdom . |
| 867428 | 5/1961 | United Kingdom . |
| 1196286 | 6/1970 | United Kingdom . |
| 1227633 | 4/1971 | United Kingdom . |
| 1238514 | 7/1971 | United Kingdom . |
| 1295945 | 11/1972 | United Kingdom . |
| 1306571 | 2/1973 | United Kingdom . |
| 1310993 | 3/1973 | United Kingdom . |
| 1312757 | 4/1973 | United Kingdom . |

Primary Examiner—Robert L. Lindsay, Jr.
Attorney, Agent, or Firm—Fleit & Jacobson

[57] ABSTRACT

A method and apparatus for producing a cellular product, such as cellular chocolate, in which the first component of the product, e.g. the chocolate, in liquid form, has introduced into it a second gaseous component which is largely soluble in the liquid first component, the gas is dispersed in the first liquid component uniformly so that it is dissolved throughout the liquid, the pressure is released suddenly, so that the dissolved component forms gaseous bubbles in the liquid and the first component in the resulting product is then solidified by cooling.

8 Claims, 3 Drawing Figures

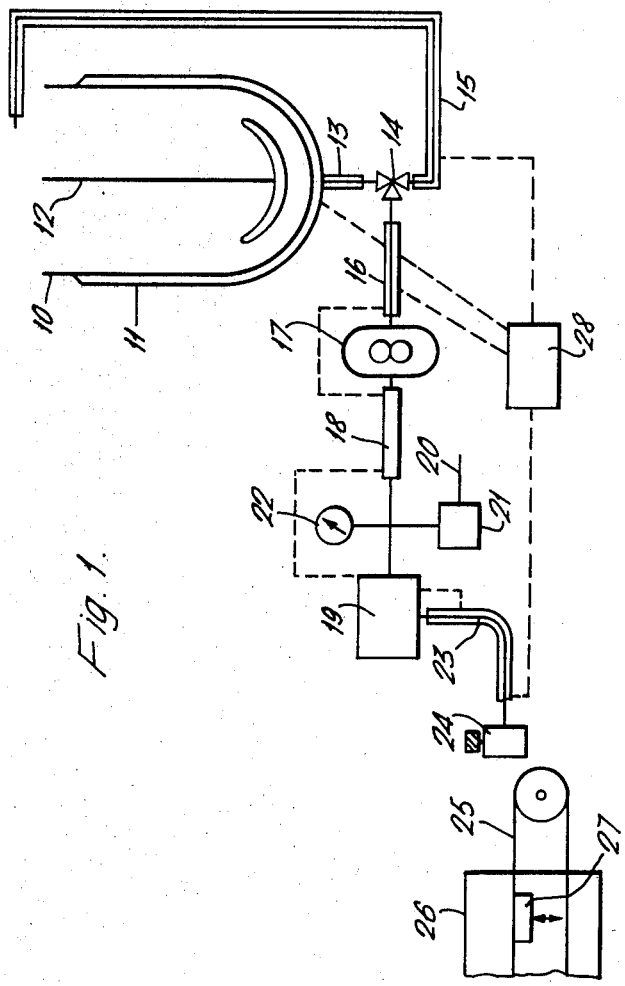

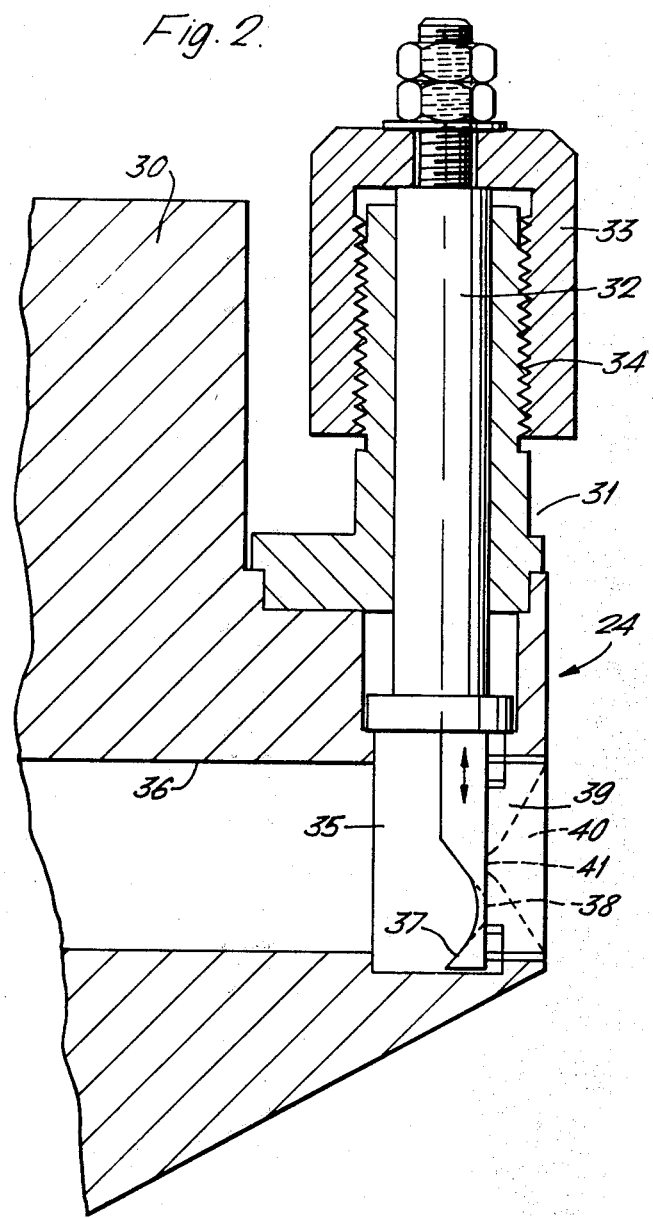

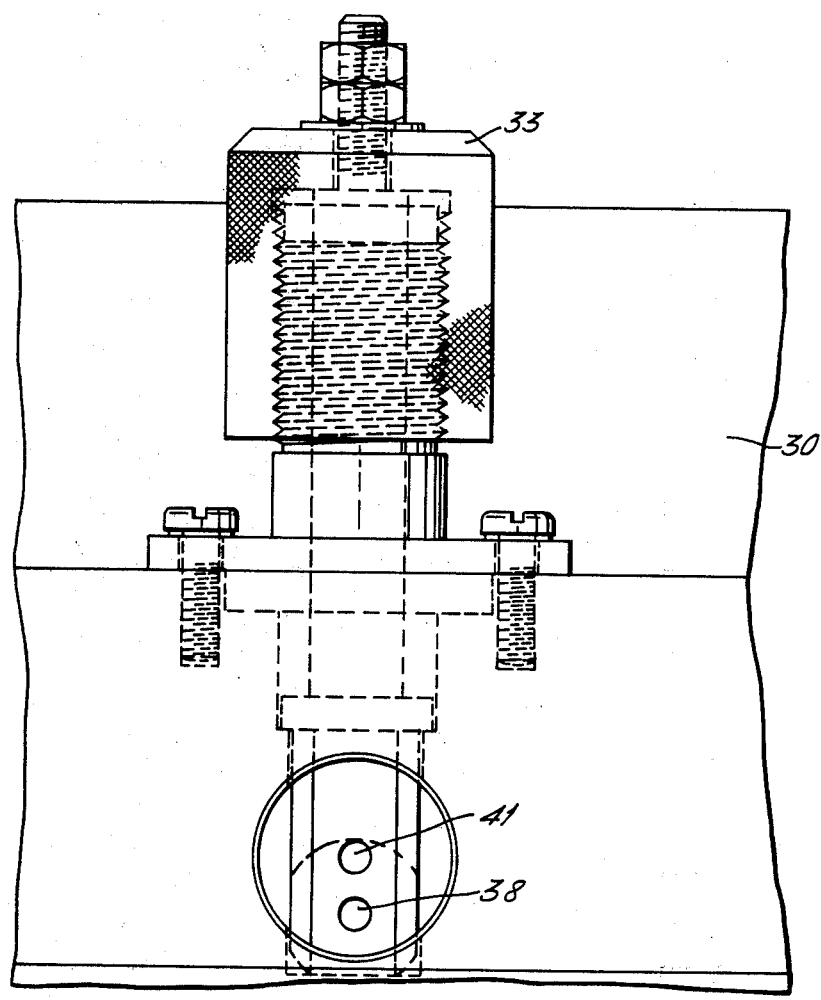

METHOD AND APPARATUS FOR PRODUCING A CELLULAR PRODUCT

This is a continuation of U.S. Ser. No. 927,922 filed July 25, 1978, abandoned.

The present invention relates to a method and apparatus for producing a cellular product and to the product produced thereby.

The invention is primarily, although not exclusively, concerned with the preparation of cellular food products, such as cellular chocolate. Various methods have been proposed for producing a cellular product. For example in British Pat. No. 867,428 there has been proposed a method of producing bread dough continuously in a hermetically closed machine in which untreated flour, salt and water are introduced into a mixing chamber to produce a slurry, the slurry is introduced under pressure into a continuous mixing machine, the gaseous medium is then introduced under pressure into the mixing machine and the mixing is continued until a homogeneous risen dough is produced in which the gaseous medium is distributed throughout the dough and finally the product is automatically fed continuously from the machine to a conveyor or baking tins.

Such a method is perfectly satisfactory for the production of dough. However, as such it is not suitable for the production of a product such as cellular chocolate.

One method of mixing cellular chocolate involves introducing into separate moulds molten chocolate to form a casing thereof, and then introducing into this casing an aerated liquid chocolate which is subsequently subjected to vacuum to induce the formation of the bubbles to form a cellular interior to the chocolate items thereby produced. This method is a good method of producing individual foam chocolate articles, but is rather lengthy and time consuming and therefore not very economic. Furthermore, it is difficult accurately to control the cell size of the cellular products.

It is now proposed, according to the present invention, to make a cellular product comprising the steps of providing a first component in a liquid form, introducing into this liquid, under pressure, a second component which is largely soluble in the liquid first component, either as a gas or as a liquified gas, dispersing the gas in the first component liquid uniformly, so that it is dissolved throughout the liquid, releasing the pressure suddenly so that the dissolved component forms gaseous bubbles in the liquid and solidifying the first component in the resulting product by cooling.

This method can be carried out as a batch process, but is preferably carried out as a continuous process. Thus, the first component is advantageously fed continuously by a pump into a continuous mixing device, which may, for example, be an in-line mixer having no moving parts. Alternatively, the mixer may be, for example, of the type illustrated in British Pat. No. 646,591. After leaving the mixer, regardless of which type of mixer it is, the liquid first component with the gaseous second component dissolved therein, is still under pressure. It then passes through a restriction which is advantageously in the form of an adjustable orifice slide valve or similar valve.

On passing through such a restriction, there is a sudden drop in pressure in the flowing mixture and the dissolved gas then expands freely to form cells in the structure of the first component. At the same time a cooling of this first component begins and can be continued either by simple atmospheric convective cooling or can be passed through a cooling chamber.

In many cases it may be advantageous in order to enhance the formation of the bubbles to effect a vibrating action on the extruded product. For example the extruded product after leaving the restriction can pass onto a conveyor belt and this belt may be caused to vibrate as it passes through a cooling tunnel.

As indicated previously, the method of the present invention is primarily intended for the production of a cellular chocolate product. Thus, one form of the present invention includes a method of making a cellular chocolate product, comprising heating a supply of chocolate to bring it to a molten state, feeding the molten chocolate under pressure to a mixing device, introducing into the molten chocolate under pressure a gas which is largely soluble in the chocolate and dispersing the gas uniformly so that it is dissolved throughout the molten chocolate, releasing the pressure on the liquid chocolate suddenly, so that the dissolved gas forms gaseous bubbles and solidifying the chocolate by cooling it, for example to atmospheric temperature.

It has been found that the product so produced can have a very high quality and a very uniform and controllable cell size.

The invention also contemplates apparatus which is suitable for carrying out the method of the invention. The apparatus of the invention, for producing a cellular product, comprises a mixing device, means for supplying a first component of the cellular product in a liquid form and introducing it into the liquid in the mixing device under pressure, means for introducing a second gaseous component into the mixing device under pressure, an outlet conduit for delivering the mixed product from the mixing device and a sharp restriction for releasing the pressure in the mixed product.

In order that the invention may more readily be understood, the following description is given, merely by way of example, reference being made to the accompanying drawings, in which:

FIG. 1 is a schematic view of one embodiment of apparatus according to the present invention;

FIG. 2 is an enlarged cross-sectional view of one form of outlet valve for use with the apparatus of FIG. 1; and FIG. 3 is an end view of the valve of FIG. 2.

Referring first to FIG. 1, a tank 10 having a surrounding water jacket 11 is provided with a stirring device 12. A jacketed outlet pipe 13 passes through a three-way plug cock 14 which has a first connection 15 for returning material to be processed to the tank 10 and a second connection 16 leading to a positive displacement pump 17, the outlet 18 of which feeds the product to be treated to a mixer 19 which is advantageously a model 4M E.T. Oakes continuous mixer.

Fed into the line 18, via a gas inlet line 20, is a stream of carbon dioxide the flow of which is measured by a flow meter 21. A pressure gauge 22 measures the pressure of the gas and liquid at the inlet to the mixer 19.

The outlet line 23 of the mixer 19 is connected to a variable orifice valve 24 to be described in more detail later. The material leaving the valve 24 is, in effect, extruded onto a conveyor 25 which passes through a cooling tunnel 26 and it is possible to vibrate the conveyor 26 by means of a vibrator 27.

The whole of the system from the tank 10 to the valve 24 is enclosed in a jacket, only the jacket 11 around the tank 10 being indicated by a reference numeral. The hot water jacket system is fed from a supply of hot water 28 and the lines joining this to the various conduits of the system are indicated in chain dotted lines.

The valve 24 is illustrated in greater detail in FIGS. 2 and 3. The valve consists of a body portion 30 carrying a piston housing 31, in which is axially reciprocable a piston 32 carrying a thimble 33 which is threaded internally at 34 to cooperate with a corresponding male thread on the housing 31.

At its lower end, the piston carries a valve member 35 which moves over the passage 36 in the housing 30, which is connected to the outlet conduit 23 of the mixer 19 illustrated in FIG. 1. The valve member is provided with a conical concavity 37 having a restricted central aperture 38. A further fixed valve member 39 is mounted in the housing 30 and includes a similar concavity 40 arranged in the opposite sense and having a central aperture 41.

The two apertures 38 and 41 are circular and as the piston is moved upwardly or downwardly as indicated by the arrow in FIG. 2 by operation of the thimble 33, the outlet orifice which is available for the flow of material is lens shaped or circular.

In operation to produce an aerated or cellular chocolate product, chocolate is placed in the tank 10 and is melted by holding the temperature of the tank 10 at about 35° C. and by operating the anchor-shaped stirrer 12.

The molten chocolate is fed from the tank at a metered rate of about 375 grams per minute by the pump 17 and is fed to the course clearance model 4M E.T. Oakes Continuous Mixer 19.

carbon dioxide gas at a pressure of about 10.5 kg/sq.cm gauge is metered by the flow meter 14 into the stream of chocolate prior to entering the mixer 19. The carbon dioxide is largely soluble in the chocolate to the extent of being 85% or higher soluble at the rate fed.

In the mixer, the carbon dioxide is dispersed uniformly throughout the chocolate and the pressure as measured by the gauge 22 is held at about 6 kg/sq.cm gauge, with substantially all the carbon dioxide dissolved in the chocolate. The mixed product is then delivered through the outlet conduit 23 to the valve 24 described above, with the pressure upstream of the outlet orifice still at substantially 6 kg/sq.cm gauge.

The type of valve illustrated in FIGS. 2 and 3 gives a sharp pressure drop in the product, so that the dissolved gas nucleates into bubbles to produce an aerated product. As the gas forms into bubbles the chocolate cools on re-entering the atmosphere and begins to solidify. This solidification is completed in the cooling tunnel 26.

If desired the vibrator 27 may be operated to facilitate the nucleation of the bubbles. The effect of the vibrator is to break the cell walls to coalesce the bubbles into larger cells. Thus the cell size can, at least in part, be controlled by suitable operation of the vibrator 27. It will also be appreciated that the cell size can also readily be controlled by the drop in temperature and by the operation of the thimble on the valve 24 to give the desired orifice size in the valve, thereby controlling the rate of pressure drop.

If desired a substantially insoluble gas may be incorporated prior to the mixer, a suitable gas being air. This insoluble gas helps to form nuclei for the starting of the formation of the bubbles.

The bubble size in the final product, for a given volumetric ratio of gas to the first component, e.g chocolate, can be controlled by varying a number of parameters. Thus, for example, it will be appreciated that:

1. The number of bubbles and hence their size per unit mass of the material may be controlled by controlling the number of nuclei or starting points present. This can be effected by a suitable seeding technique.

2. For small bubble sizes, seeding will be required to produce sufficient nuclei as the gas comes out of the solution.

3. For larger bubble sizes there will often be too many naturally occurring and not easily eliminated nuclei, in which case controlled coalescence of small bubbles into larger bubbles is required.

4. Nuclei can be made available by any of the following:
   (a) an undissolved portion of the relatively soluble gas itself dispersed as very small bubbles. This can be produced by providing more of the soluble gas than would normally readily dissolve.
   (b) from relatively insoluble gases, such as air, which already occurs in the product (e.g. chocolate) being mixed. Such gases are, in fact, largely included in the tank 10 in the method indicated above.
   (c) the presence of small angular pieces in the product of which the sharp edges may be internal or external. These sharp edges may simply be formed by corners of crystals of sugar etc., which may naturally occur or be introduced into the initial component which is being made liquid.
   (d) one may deliberately add a relatively insoluble but compatible gas, such as air, as indicated above which can be dispersed in a very fine nuclei of bubbles in the mixer even when high level operating pressure is applied.

5. Coalescence may be controlled by:
   (a) the rate of pressure drop from the high pressure level to the atmospheric pressure, that is by controlling the valve 24.
   (b) shear rate, rate of movement or distance moved, temperature gradients in space or time. Thus, the drop in temperature can be controlled by controlling the temperature of the initial product and of the cooling tunnel and the shear rate can be controlled by operation of the vibrator.

The method of the present invention has been described with reference to a product which is solid at normal atmospheric temperature. It is, of course, equally applicable to products which are liquid, or at least fluid, at atmospheric temperature. In this case, the conveyor 25, or its equivalent, could be arranged to pass through a refrigerated chamber. In this way a cellular iced confection could be produced.

If it is used to produce a chocolate product, then a non-cellular chocolate coating could be provided by extruding over the outside of the product as it is formed downstream of the valve 24. This could itself be encased in a suitable sleeve, for example, formed of a material such as that sold under the Trade Name "Cellophane". Similarly the extrusion could take place internally of the cellular product, so that a confection such as marshmallow or the like could be formed inside the cellular chocolate product.

It will be appreciated that while reference has been made herein to there being a soluble gas or liquefied gas as the second component more than one such gas can be used. Similarly, more than one insoluble gas can be used to assist nucleation.

I claim:

1. A method of making a cellular food product comprising the steps of:
   (a) providing an edible component;
   (b) heating the edible component to render it in the molten condition;
   (c) introducing into the molten component under pressure either a gas or a liquified gas which is largely soluble in the molten component;
   (d) mixing the molten component and gas to disperse the gas uniformly in the molten component so that it is thoroughly dissolved throughout the molten component while maintaining the molten component and gas under pressure;
   (e) then suddenly releasing the pressure by expansion to atmospheric pressure whereby the dissolved gas forms gaseous bubbles in the molten component; and
   (f) solidifying the molten component into the finally deposited resulting cellular food product by cooling.

2. A method as claimed in claim 1, wherein the molten component is fed continuously by a pump into a continuous mixing device.

3. A method as claimed in claim 2, wherein the pressure is released suddenly by passing the molten component through a restriction.

4. A method as claimed in claim 3, wherein the restriction comprises an adjustable valve.

5. A method as claimed in claim 3 and further comprising the step of subjecting the product passed through the restriction to a vibrating action.

6. A method of making a cellular chocolate product comprising the steps of:
   (a) providing chocolate;
   (b) heating the chocolate to render it in the molten condition;
   (c) introducing a gas which is largely soluble in chocolate into the molten chocolate under pressure;
   (d) mixing the molten chocolate and gas to disperse the gas uniformly throughout the molten chocolate so that the gas is thoroughly dissolved throughout the molten chocolate, while maintaining the molten chocolate and gas under pressure;
   (e) then suddenly releasing the pressure from the molten chocolate containing the dissolved gas by expansion to atmospheric pressure to cause the dissolved gas to nucleate and form a multitude of gaseous bubbles evenly distributed throughout the molten chocolate; and
   (f) solidifying the molten chocolate with the gaseous bubbles evenly distributed throughout it into the finally deposited resulting cellular chocolate product.

7. The method of claim 6, wherein the gas which is largely soluble in the chocolate is carbon dioxide.

8. The method of claim 6 further comprising the step of mixing a second gas which is largely insoluble in the molten chocolate to disperse it uniformly throughout the molten chocolate.

* * * * *